United States Patent

Kirkpatrick et al.

[15] 3,650,646
[45] Mar. 21, 1972

[54] APPARATUS FOR FORMING POWDER COMPACTS OF UNIFORM INTERCONNECTED POROSITY

[72] Inventors: Milton E. Kirkpatrick, Palos Verdes Peninsula; Ralph A. Mendelson, Westminster, both of Calif.

[73] Assignee: TRW Inc., Redondo Beach, Calif.

[22] Filed: Aug. 8, 1969

[21] Appl. No.: 848,641

Related U.S. Application Data

[60] Division of Ser. No. 707,813, Feb. 23, 1968, Pat. No. 34,946,425, which is a continuation-in-part of Ser. No. 509,970, Nov. 26, 1965, abandoned.

[52] U.S. Cl. ......................... 425/78, 425/DIG. 26, 425/77
[51] Int. Cl. ......................................................... A61c 13/00
[58] Field of Search ............... 18/5 H, 34 R, DIG. 44, 16 R, 18/DIG. 26

[56] References Cited

UNITED STATES PATENTS 3,038,199  6/1962  Bartow et al. ......................... 15/5 H
3,462,797  8/1969  Asbury ............................. 18/DIG. 44
3,517,413  6/1970  Takahashi et al. ....................... 18/16 R

*Primary Examiner*—H. A. Kilby, Jr.
*Attorney*—Daniel T. Anderson, James V. Tura and Jerry A. Dinardo

[57]  ABSTRACT

Powder compacting apparatus includes an enclosure made of two parts of elastomeric material. One internal part contains the powder and is made of relatively soft, flowable, elastomeric material. The other part is external to the first part and is made of relatively hard, elastomeric material. The enclosure fits in a die cavity, with the hard elastomeric part placed to form a seal between the soft elastomeric part and the interface or open junction between walls of the die cavity. Pressing force applied to the die is transmitted to all sides of the enclosure to exert pressure isostatically on the powder, with the hard elastomeric part pressed against the wall interface of the die cavity to prevent extrusion of the soft elastomeric part from the die cavity.

12 Claims, 9 Drawing Figures

Patented March 21, 1972

Milton E. Kirkpatrick,
Ralph A. Mendelson,
INVENTORS.
BY.

*Jerry G. Dinardo*

AGENT

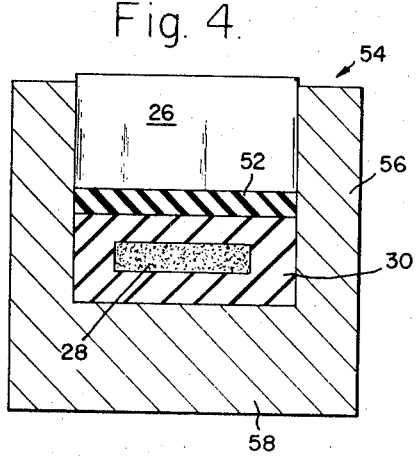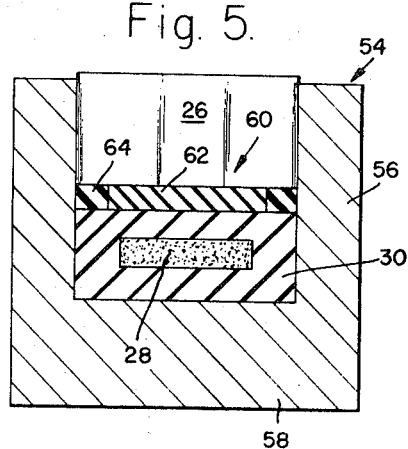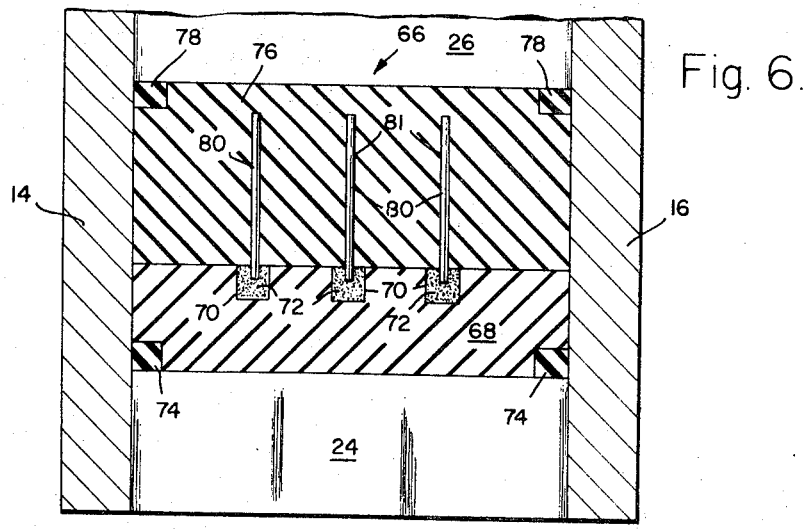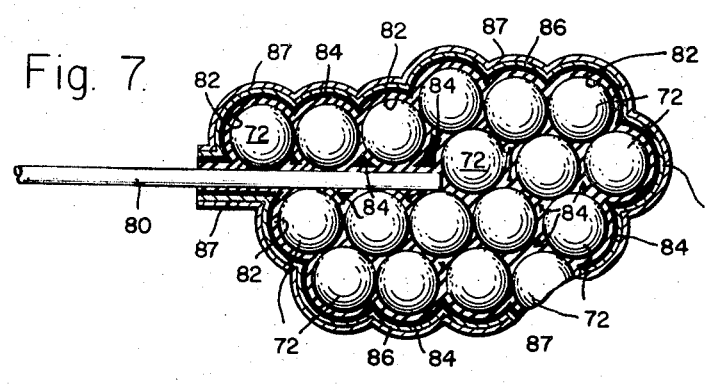
Milton E. Kirkpatrick,
Ralph A. Mendelson,
INVENTORS.
BY
Jerry G. Duiado
AGENT Patented March 21, 1972
3,650,646
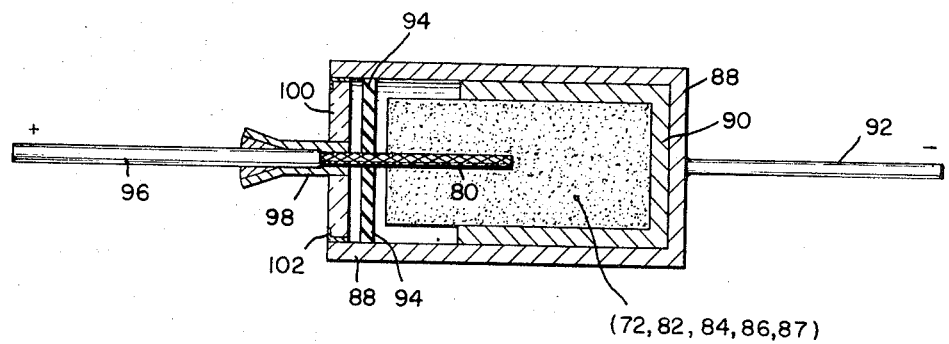
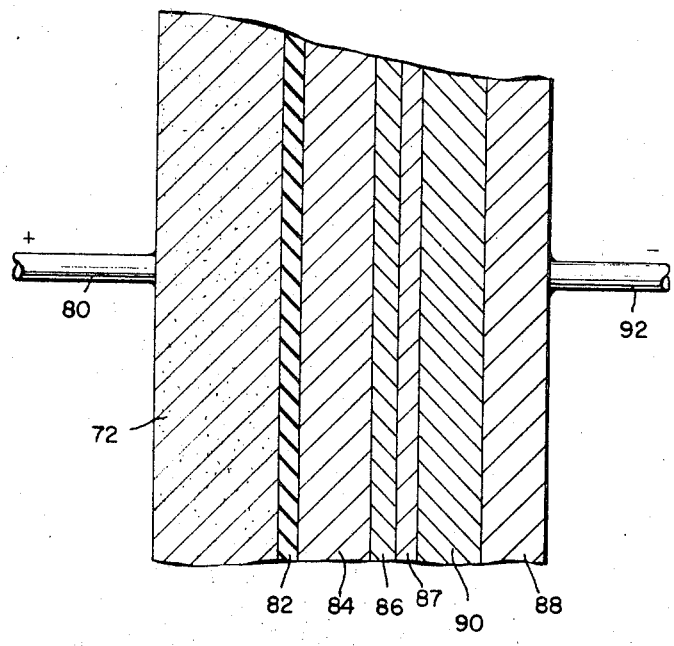
Milton E. Kirkpatrick,
Ralph A. Mendelson,
INVENTORS.
BY.
*Jerry A. Dinardo*
AGENT

APPARATUS FOR FORMING POWDER COMPACTS OF UNIFORM INTERCONNECTED POROSITY

CROSS REFERENCE TO RELATED APPLICATIONS

This application is a division of application Ser. No. 707,813 filed Feb. 23, 1968, now U.S. Pat. No. 3,496,425 which in turn is a continuation-in-part of application Ser. No. 509,970 filed Nov. 26, 1965, now abandoned.

The invention herein described was made in the course of or under a contract or subcontract thereunder, with the Department of the Air Force.

BACKGROUND OF THE INVENTION

1. Field of the Invention

This invention relates to the art of forming powder into shaped articles, and particularly to the art of forming powder compacts of a uniform interconnected porosity.

There are many applications that require the use of porous powder compacts of uniform interconnected porosity. Such powder compacts find use in porous tungsten ionizers, tantalum capacitors, fuel cell electrodes, precision filters, heat pipe liquid transfer bodies, controlled surface area members, flow control devices, liquid gas separation devices, and precision diffusers, to mention a few examples.

2. Description of the Prior Art

To further explain the need for uniform interconnected porosity in powder compacts, one of the foregoing applications cited by way of example will be described in more detail. One type of ion engine currently being developed for long term space flights is known as a contact-type ion engine. In such an ion engine, a stream of cesium vapor atoms is passed through a heated porous tungsten member which serves as an ionizer. In passing through the heated tungsten member, the cesium vapor particles lose an electron and emerge as ions. The ions are then subjected to accelerating electric fields to produce a desired thrust.

Invariably, a number of the cesium vapor atoms pass through the tungsten member as neutral atoms, thereby degrading the efficiency of the porous ionizer. Since the fractional part of neutral cesium atoms is dependent upon the flow rate or current density of the total cesium flow, uniformity in the interconnected porous structure is a critical factor in promoting high ion yield. By uniform interconnected porosity is meant that the many paths connecting the pores of the ionizer are of minimum and uniform width and spacing.

The conventional methods of fabricating the tungsten ionizer involve pressing tungsten powder in a complex and expensive steel die, using long dwell times and relative high compacting pressures. The results obtained from such methods usually fail to produce compacts that meet the requirements for ion emitters, for a number of reasons. In the first place, the use of a steel die results in a significant wall friction which prevents the compacting pressure from being applied uniformly across the structure, thereby causing variations in the density of the compact as well as nonuniformity of the interconnected porosity. Accordingly, the use of long dwell times at high pressure within the steel die results in deformation of the tungsten at the surface of the compact and destroys the interconnected porous structure. The lack of interconnected porosity produces nonuniformity of the permeable porosity.

Another need for powder compacts of uniform interconnected porosity exists in the manufacture of porous, sintered tantalum anodes for use in capacitors. Such anodes are made from porous compacts of tantalum powder. A high degree of uniform interconnected porosity is necessary to obtain a high CV, which is an abbreviation for the product of capacitance times voltage. The CV product or CV of a capacitor is a figure of merit which describes the qualities of the capacitor in terms of its capacitance and formation voltage.

The construction of a capacitor having a porous, sintered tantalum anode is essentially the following. Tantalum powder is pressed into a dense but porous compact and sintered to produce one electrode, called the anode. The surface area of this consists of all the surfaces of the powder particles that are interconnected through the pores of the compact. The anode is anodized to form an oxide film on the porous tantalum, without filling the pores. The oxide film serves as the dielectric and its thickness is directly proportional to the forming voltage or voltage applied during the anodization process. The pores are then filled with conductive material which serves as the other electrode and is called the counterelectrode.

It can be seen that any pores that are isolated from, and not connected with, the remaining pores of the sintered anode are not reached either by the dielectric film or by the counterelectrode material. These isolated pores are completely ineffectual in the capacitor. Thus, the more interconnected pores there are, the greater the capacitance that can be obtained, since the capacitance value is directly proportional to the electrode surface area, which in turn is determined by the interconnected pore area. The smaller the powder particle size, the greater the electrode surface area.

In connection with the discussion above on the CV of a capacitor, it was stated that V was an abbreviation for voltage. More precisely, the V refers to the formation voltage applied during the anodizing process. The higher the formation voltage V, the thicker the dielectric film, and, thus, the higher the breakdown voltage. Conversely, the thicker the dielectric film, the lower the capacitance C. This results from the well-known relationships that the capacitance is inversely proportional to the electrode spacing, the breakdown voltage is directly proportional to the electrode spacing, and the thickness of the dielectric film determines the electrode spacing.

Accordingly, a primary object of this invention is to produce powder compacts of uniform and greater interconnected porosity.

A further object of this invention is to provide means by which substantially isostatic pressure will be applied to a powder during its formation into a compact.

SUMMARY OF THE INVENTION

The foregoing and other objects are realized according to this invention by means wherein a charge of compactible powder particles is enclosed within an elastomeric container made of two parts of different hardness and flowability. The powder particles are completely enclosed in the first part of relatively soft, flowable, elastomeric material. The other part, which is made of relatively hard, non-flowable, elastomeric material, is placed externally of the first part. The two-part container is shaped to conform to the shape of a die cavity, where it is placed and compressed. In the die cavity, the hard elastomeric part is in such a position as to provide a seal between the soft elastomeric part and the crevices in the die, such as the junction that is located between a die wall and a die punch. Due to its flowability, the inner, relatively soft, elastomeric material transmits substantially isostatic pressure to the powder. The outer relatively hard elastomeric material prevents the soft material from extruding out of the die, and thereby allows the pressure equilibrium on the compact to be maintained.

BRIEF DESCRIPTION OF THE DRAWING

In the drawing:

FIGS. 4 and 5 are sectional views showing alternative forms of apparatus according to the invention;

FIG. 6 is a sectional view of apparatus for forming tantalum anodes for use in slug capacitors;

FIG. 7 is a greatly enlarged, fragmentary, sectional view showing some of the component parts of a tantalum slug capacitor;

FIG. 8 is a sectional view of a complete tantalum slug capacitor; and

FIG. 9 is a greatly enlarged sectional view of an elemental capacitor associated with a single tantalum powder particle.

DESCRIPTION OF THE PREFERRED EMBODIMENTS

Figure 1:
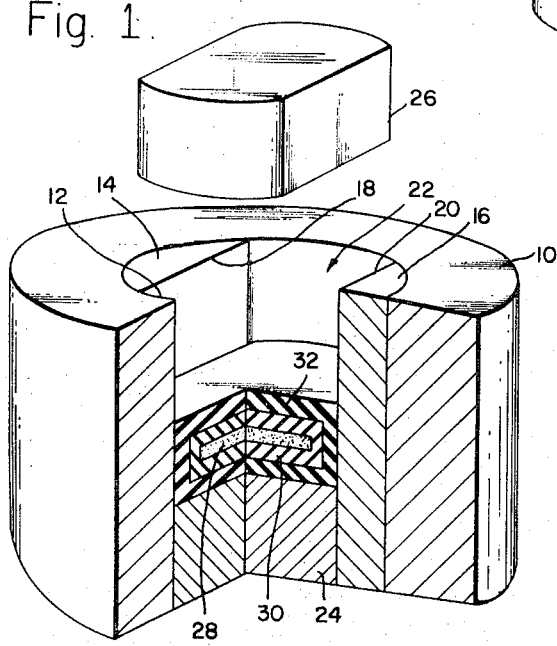
FIG. 1 is a perspective view, partly in section and with portions removed, of one form of apparatus for fabricating powder compacts in accordance with the invention.

Referring to FIG. 1, there is shown a cylindrical die member 10 provided with a longitudinal cylindrical bore 12. Within the cylindrical bore 12 and extending along the length thereof are a pair of oppositely disposed die shoes 14 and 16. The die shoes 14 and 16 are curved on their outer surfaces to mate with the inner surface of the cylindrical bore 12. The die shoes 14 and 16 have inner surfaces 18 and 20 which are flat, and are arranged so that the flat surfaces 18 and 20 are parallel to each other. Thus, there is formed within the die member 10 a die cavity 22, which is bounded by the flat surfaces 18 and 20 of the die shoes 14 and 16, respectively, and by the exposed inner surface portions of the cylindrical bore 12.

Fitted within the die cavity 22 is a bottom punch 24. Shown above the die cavity 22 is a top punch 26, which is similar to the bottom punch 24. In operation, the top punch 26 may be lowered into the die cavity 22 to compress an assembly nested between the punches 24 and 26 and containing a compactible powder, as will be explained.

The die member 10, the die shoes 14 and 16, and the two punches 24 and 26 are all made of hard, non-deformable material such as steel. While the die cavity 22 is shown as having a generally rectangular configuration, it should be understood that other configurations may be used to suit manufacturing needs.

In accordance with one embodiment of the invention, means are provided for enclosing a compactible powder within an assembly forming dual elastic containers. A compactible powder 28, made of metal or non-metal, is enclosed within a first container 30 made of relatively soft, flowable, elastomeric material. The first container 30 is snugly enclosed within a second container 32 made of relatively hard, non-flowable, elastomeric material, with the second container shaped to fit rather loosely within the walls of the die cavity 22. The interior of the first container 30 is shaped to conform to the configuration desired of the final powder compact, which in this example is illustrated as being a thin, flat, rectangular plate. The horizontal surfaces of the two elastomeric containers 30 and 32 are parallel to the horizontal bearing surfaces of the two punches 24 and 26.

Figure 2:
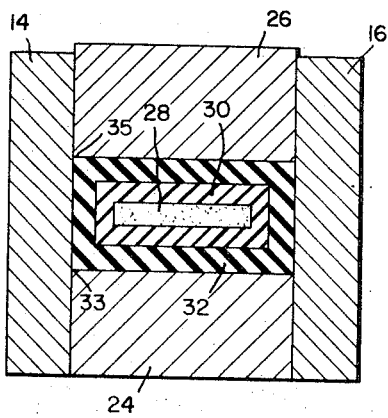
FIG. 2 is a sectional view of the apparatus of FIG. 1.

In operation, the top punch 26 is lowered into the die cavity 22, as shown in FIG. 2, and suitable force is applied to the two punches 24 and 26 to compress the assembly comprising the two containers 30 and 32 and powder 28. The compressing force is transmitted through the second container 32 to the first container 30. Being a relatively soft and flowable material, the first container 30 acts like a liquid under pressure, and absorbs any pressure gradients exerted upon it by the second container 32. Consequently, the first container 30 distributes the pressure uniformly over all surfaces of the powder 28. The first container 30 can be said to exert pressure substantially isostatically over the powder 28.

Because the pressure is uniformly distributed over the powder 28, there is less tendency of the pores between the powder particles to close during compaction. As a result, the powder particles can be compacted to a higher density, corresponding to the most efficient packing of spherical particles, while still retaining the desired uniform interconnected porosity.

Being relatively hard and less flowable, the second container 32 confines the softer, more flowable material of the first container 30 so that neither the powder 28 nor the material of the first container 30 are extruded from the die cavity 22. The second container 32 forms a seal at the crevices or junctions 33 and 35 between the side walls of the die cavity 22 and the vertical surfaces of the die punches 24 and 26, respectively. In the past, extrusion of powder material along the walls of the die cavity has resulted in scoring of the walls of the steel die. Such an occurrence is practically eliminated by the isolation afforded by the second container 32. The hardness or toughness of the material of the second container 32 prevents the material of the second container 32 from extruding from the walls of the die cavity 22 under the high pressure required for compacting the powder 28.

Due to the elasticity of the materials of both containers 30 and 32, they return to their original size when the compacting pressure is relieved, thereby releasing the powder compact. This prevents any mechanical damage of the powder compact during its removal from the die cavity 22.

Figure 3:
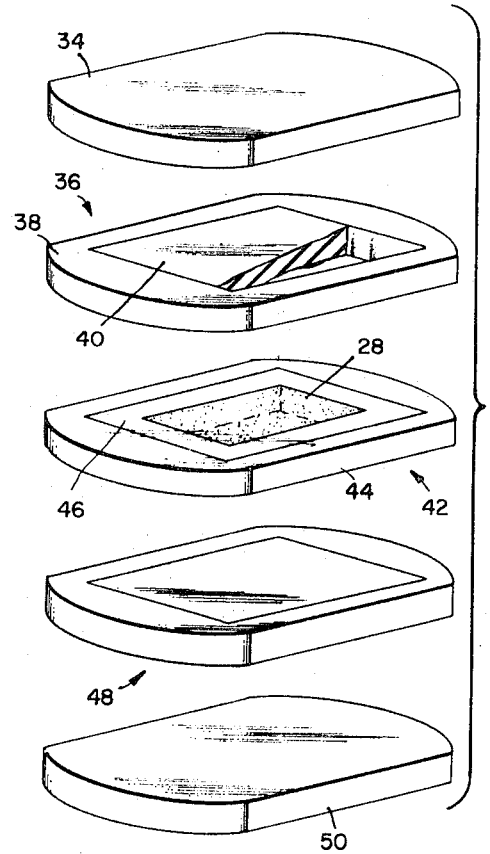
FIG. 3 is an exploded view showing one means of assembling dual elastic containers for a powder compact in accordance with the invention.

FIG. 3 is an exploded view of one means by which the powder 28 can be assembled within the containers 30 and 32. However, it will occur to those skilled in the art that other arrangements may be used for assembly. The container assembly shown consists of five flat layers of elastic material, all of which conform to the contours of the walls of the die cavity 22. The first layer 34, which is placed upon the bottom punch 24, is a solid layer of the hard elastomeric material. The second layer 36, which is placed upon the first layer 34, is formed of a rim 38 of a hard elastomeric material which surrounds a rectangular insert 40 made of the soft elastomeric material. The third layer 42, which is placed upon the second layer 36, consists of a rim 44 of a hard elastomeric material provided with a liner 46 of the soft elastomeric material. The space within the liner 46 forms a cavity which will be filled with the powder 28. The fourth layer 48 is identical to the second layer 36 and is placed upon the third layer 42, thereby enclosing the powder 28 within a container of soft elastomeric material. The fifth layer 50 is identical to the first layer 34 and is placed upon the fourth layer 48 to enclose the first container within a second container of hard elastomeric material.

It has been found that spherical powder particles provide the most uniform porous structure combined with the optimum density both of solid material and of interconnected porosity. For use in ionizer applications, tungsten compacts have been successfully made and operated, using tungsten spheroids falling within two size ranges. In the smaller size range the tungsten particles ranged in diameter from 2 to 5 microns, while in a larger size range they ranged in diameter from 7 to 9 microns. The compacting pressure ranged from 35,000 to 50,000 pounds per square inch, applied for a period of less than 1 minute. Following the compaction process, the tungsten compact was sintered at about 2,000° centigrade in a vacuum furnace for about an hour. Porous tungsten structures having interconnected porosities of 99 percent and higher have been achieved for both the above particle size ranges.

One material that has been successfully used for the soft elastomeric material is a silicon rubber having a Shore A hardness less than about 40. This material is known in the trade as Dow Corning DC 6510. An example of a material that has been successfully used for the hard elastomeric material is a polyurethane elastic material known in the trade as American Latex Daycollan 80. This material has a Shore A hardness of about 80. It is apparent that other suitable materials may be used for both the soft and hard elastomeric materials.

While the hard elastomeric material has been shown as a container 32 completely enclosing the inner container 30, it will be understood that such construction may be generally used to seal in the soft elastomeric material no matter where the crevices are located in the die cavity walls. However, it may be preferred to utilize a more simplified construction by employing a simple insert or a thin slab of the hard elastomeric material at the locations where such wall crevices or junctions occur.

FIG. 4 shows an alternative arrangement in which a slab 52 of hard elastomeric material is placed between a top die punch 26 and the soft elastomeric container 30 that is placed in a die 54 where side wall 56 and base 58 are formed of a single piece of metal. The slab 52 forms a seal between the top die punch and the internal surface of the wall 56.

In FIG. 5, a slab 60 placed between the top die punch 26 and the soft elastomeric container 30 has an inner portion 62 of soft elastomeric material and a rim 64 of hard elastomeric material. The rim 64 provides a seal between the top die punch and the internal surface of the die wall 56 is much the same fashion as the slab 52 of FIG. 4 and container FIGS. of FIGS.. 1–3.

FIG. 6 illustrates apparatus for fabricating porous tantalum anodes for use in tantalum slug capacitors. An elastomeric enclosure 66 is disposed in a die cavity between die shoes 14 and 16 and die punches 24 and 26. The elastomeric enclosure 66 includes a bottom slab 68 of soft elastomeric having a number of cavities 70 formed in its upper surface for containing tantalum powder 72. An insert 74 of hard elastomer rims the outer periphery of the lower side of the slab 68. On top of the bottom slab 68 is placed a top slab 76 of soft elastomer, the upper side of which is rimmed with an insert 78 of hard elastomer. Prior to compacting, a tantalum wire 80 is inserted in each mass of powder 72, with the wires 80 held vertically in place in long, narrow holes 81 in the top slab 76.

When the enclosure 66 is compressed, the powder masses are squeezed into compacts having the wires 80 embedded therein. When the pressure is released from the die, the two slabs 68 and 76 can be separated and the powder compacts may be lifted out of the cavities 70 by the wires 80.

Tantalum powder particles having an average size of 4 microns have been compacted at pressures of 2,000 to 8,000 pounds per square inch sustained for approximately 15 seconds to form compacts of about 50 percent density; that is, 50 percent powder volume and 50 percent pore volume. These compacts have been formed without the use of binders or lubricants.

The powder compacts are then sintered in vacuum for approximately 10 to 30 minutes at temperatures from about 1,600° to 2,000° centigrade to achieve the required densification.

A prior art process for fabricating tantalum capacitors will now be described with the aid of FIG. 7. The sintered powder compact will hereinafter be referred to as the anode. The sintered anode is first anodized in a water solution of phosphoric acid to produce a film of tantalum pentoxide, which is the dielectric film. The dielectric film 82 covers the exposed surfaces of the tantalum powder 72 and the embedded portion of the tantalum wire 80. The dielectric film 82 forms at a thickness of about 15 angstroms per volt of anodizing or formation voltage.

After anodizing, the anode is dipped in a solution of manganese nitrate to fill the pore space. The anode is then baked to decompose the manganese nitrate and produce a conductive film of manganese dioxide over the dielectric film 82. The process of dipping and baking is repeated several times until the entire pore space is filled with the conductive film 84 of manganese dioxide. The internal pore fillings of manganese dioxide are interconnected with the surface coatings of manganese dioxide to seal the dielectric film 82.

The external surface of the conductive film 84 is next coated with a graphite solution, known in the trade as Aquadag, to form a graphite conductive coating 86. The graphite coating 86 does not penetrate the already filled pore space. The assembly is next dipped in a silver solution to coat the graphite with silver coating 87.

Referring now to FIG. 8, the assembly is placed in a metal can 88 that has been pretinned on the inside, and the space between the can 88 and the silver is filled with solder 90. A cathode lead 92 is secured to the can 88 by welding. The remaining constructional elements consist of an insulating washer 94 for centering the tantalum wire 80; an anode lead 96 butt welded to the tantalum wire; a metal gland 98 soldered to the anode lead 96; a glass bead 100 sealed to the metal gland 98; and a metal ring 102 sealed to the glass bead 100 and soldered to the can 88. The gland 98 and ring 102 are preferably made of alloyed metal sold under the trademark Kovar and having a composition of 54% iron, 28% nickel, and 18% cobalt.

A highly magnified section of one of the elemental capacitors associated with a single tantalum powder particle is shown schematically in FIG. 9. The elemental capacitor is essentially comprised of a powder particle 72, the dielectric coating 82 and the conductive coating 84. The total capacitance is the sum of all the elemental capacitors connected in parallel.

Tantalum anodes have been made with the apparatus of the invention which have a sintered density of about 50 to 80 percent and an interconnected porosity of over 90 percent. By 90 percent interconnected porosity is meant that over 90 percent of the total pore volume is fully interconnected. Using anodes made from tantalum powder with an average particle size of 4 microns, capacitors have been fabricated which have CV's of above 6,000 microforad-volts per gram as compared with CV's of 2,000 to 2,200 microforad-volts per gram for conventional tantalum capacitors. With a tantalum particle size of 8 microns, CV's of above 2,500 have been obtained as compared with CV's of 1,500 in conventional tantalum capacitors.

The embodiments of the invention in which an exclusive property or privilege is claimed are defined as follows:

1. In combination:
means forming a die cavity and including a base portion, side walls, and a member movable along said side walls and terminating in an internal surface within said cavity that forms a junction with said side walls; and
enclosure means within said die cavity and dimensioned to fit within said die cavity;
said enclosure means including an all enclosing cavity-forming portion for containing a charge of compactible powder particles and formed of relatively soft, elastomeric solid material;
said enclosure means also including an external portion of relatively hard, elastomeric solid material arranged between the internal surface of said movable member and said cavity-forming portion so as to engage said internal surface and said side walls at the junction thereof;
whereby when said movable member is forced against said enclosure means, pressure is exerted isostatically upon said enclosure means and said powder particles, and said external portion forms a seal at said junction.

2. In combination:
means forming a die cavity defined by walls of hard, relatively nondeformable material, with a portion of said walls being movable relative to other portions thereof to form a sliding junction;
within said die cavity an enclosure means formed of relatively soft, elastomeric, solid material and capable of assembly to form a closed cavity for containing a charge of compactible powder particles; and
sealing means formed of relatively hard, elastomeric solid material disposed between and abutting said enclosure means and said relatively movable wall portions, whereby upon relative motion of said cavity wall portions, pressure is exerted isostatically by said cavity walls on said sealing means and enclosure means to seal said junction and to compress said powder particles isostatically.

3. In combination:
means forming a die cavity bounded by walls of hard, relatively nondeformable material, one of said walls being movable within said cavity relative to an adjacent wall and forming a junction therewith;
within said die cavity an enclosure means formed of elastomeric material and capable of assembly to form a closed cavity for containing a charge of compactible powder particles;
said enclosure means including an internal portion of relatively soft, solid material for containing said powder particles, and an external portion of relatively hard, solid material; and said cavity walls and said enclosure means being so dimensioned and arranged that when force is exerted on said movable wall, said walls engage and exert pressure isostatically on said enclosure means and said powder particles while said external portion seals said wall junction from said internal portion.

4. The invention according to claim 3, wherein said external portion is capable of assembly to snugly enclose said internal portion.

5. The invention according to claim 3, wherein said external portion is dimensioned to engage the entire surface area of said movable wall.

6. The invention according to claim 3, wherein said external portion comprises an annular member dimensioned to engage only a peripheral surface area of said movable wall.

7. The invention according to claim 3, wherein said external portion comprises a slab coextensive with said movable wall.

8. The invention according to claim 3, and further including means forming a plurality of separate cavities in said internal portion for containing individual masses of said powder particles; and means forming elongated holes in said internal portion, one hole assigned to each of said separate cavities and communicating therewith for containing separate wires for embedding in each of said individual powder masses.

9. The invention according to claim 3, wherein said soft elastomeric material has a Shore A hardness no greater than about 40.

10. The invention according to claim 9, wherein said soft elastomeric material is made of silicone rubber.

11. The invention according to claim 3, wherein said hard elastomeric material has a Shore A hardness of at least about 80.

12. The invention according to claim 11, wherein said hard elastomeric material is made of polyurethane.

* * * * *

UNITED STATES PATENT OFFICE
CERTIFICATE OF CORRECTION

Patent No. 3,650,646            Dated March 21, 1972

Inventor(s) Milton E. Kirkpatrick and Ralph A. Mendelson

It is certified that error appears in the above-identified patent and that said Letters Patent are hereby corrected as shown below:

Cover Page, line 14 of left column  delete "34,946,425"

and substitute --3,496,425--

Column 4, line 54  delete "silicon" and substitute --silicone--

Column 5, line 8  after "container" insert --32-- line 8  delete "FIGS."

line 14  delete "elastomeric" and substitute

--elastomer--

Signed and sealed this 18th day of July 1972.

(SEAL)
Attest:

EDWARD M.FLETCHER,JR.              ROBERT GOTTSCHALK
Attesting Officer                  Commissioner of Patents